L. DIAMOND.
COMBINED AUTO BOX AND SEAT.
APPLICATION FILED MAY 19, 1914.
1,175,135.
Patented Mar. 14, 1916.
4 SHEETS—SHEET 1.
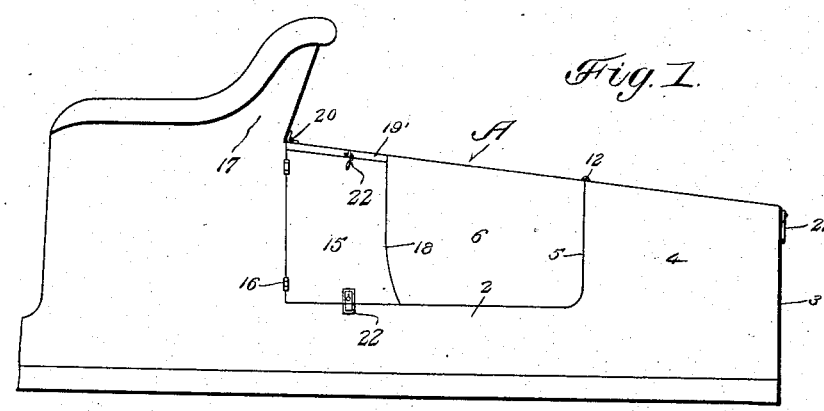
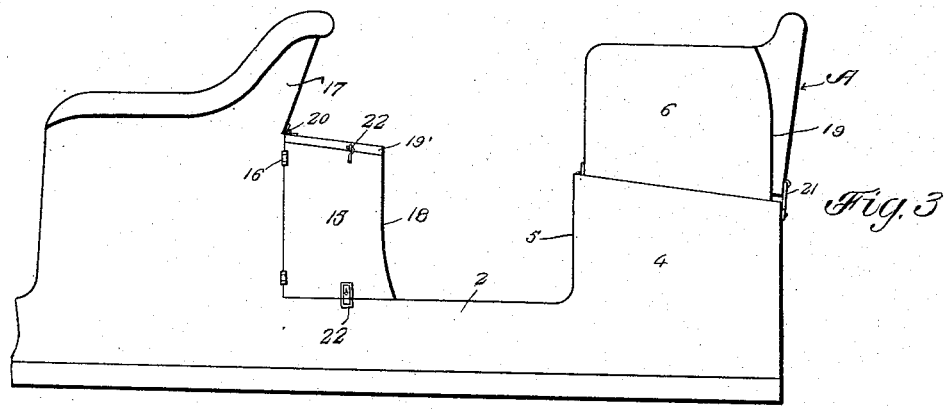
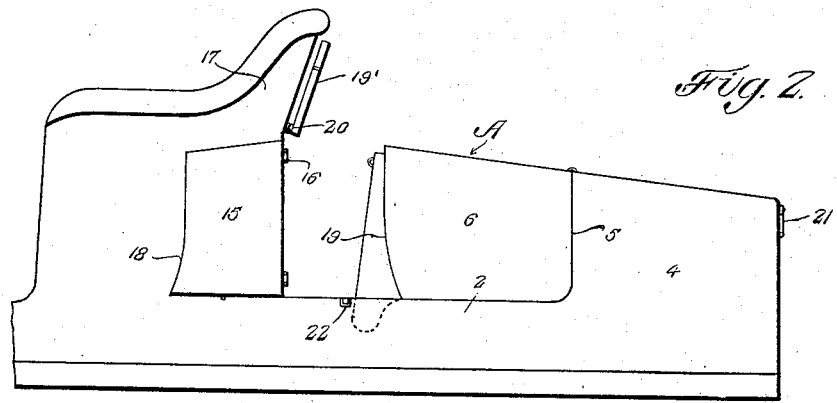

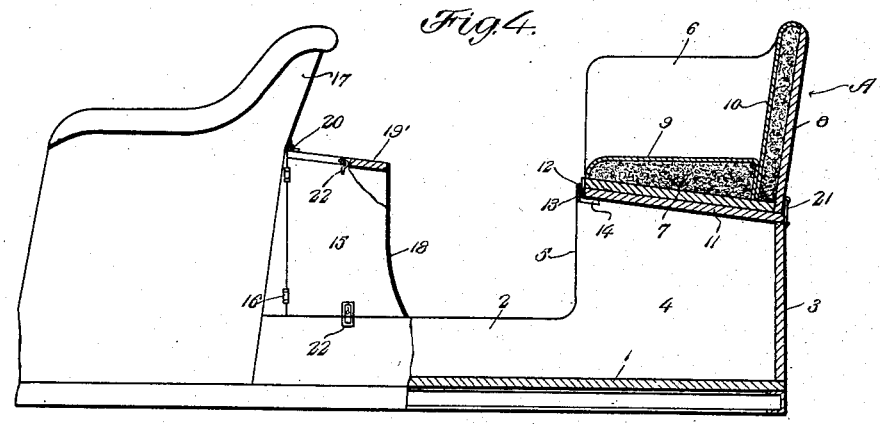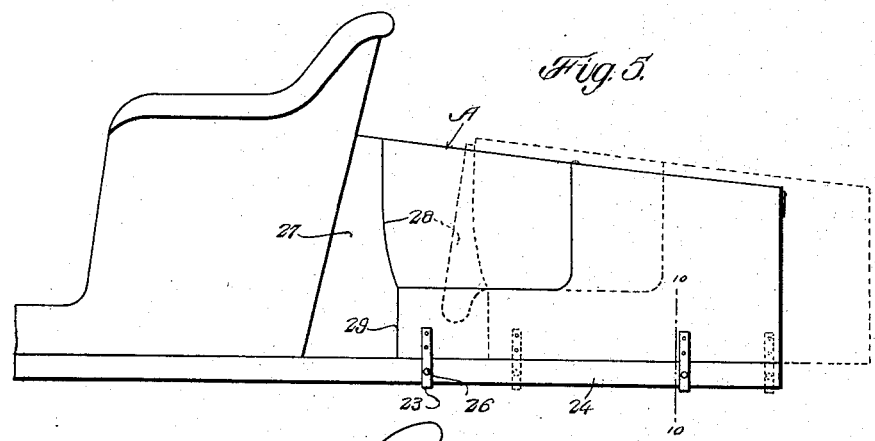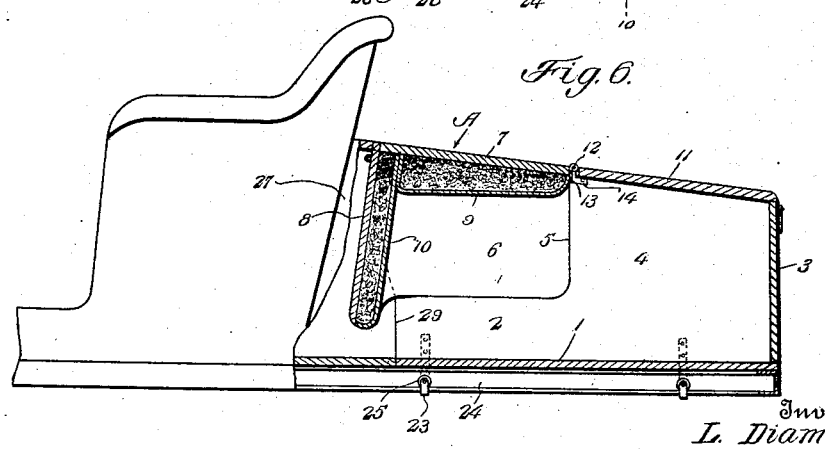

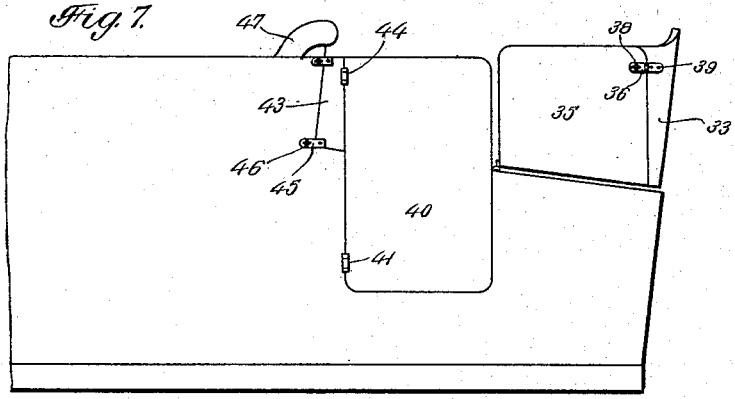
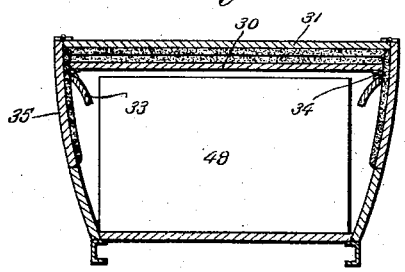
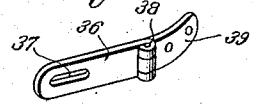
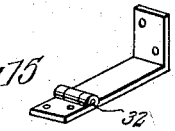
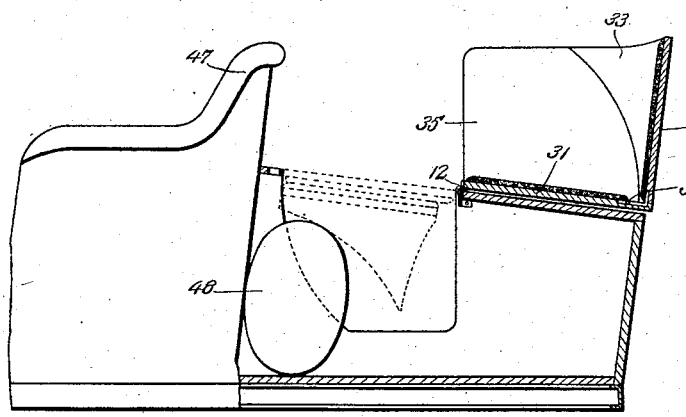

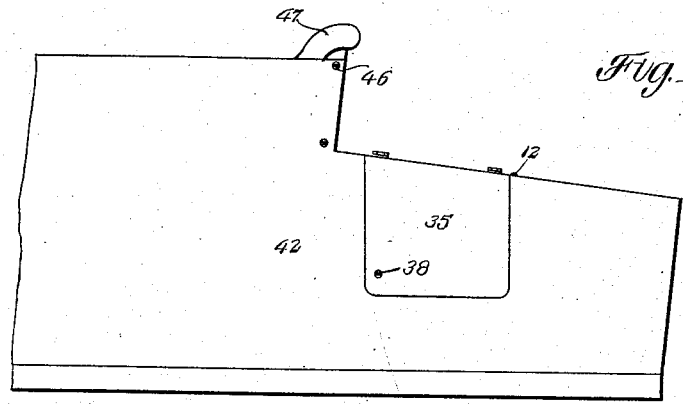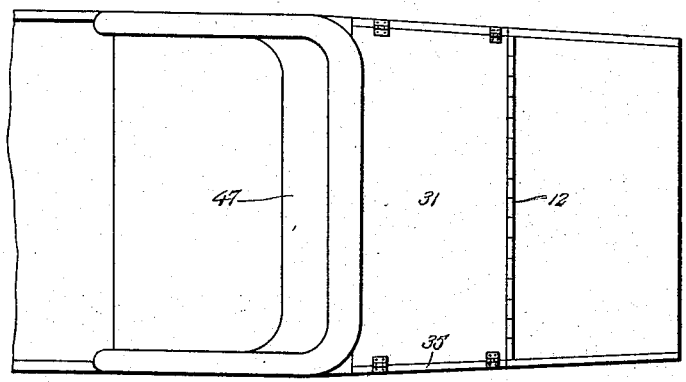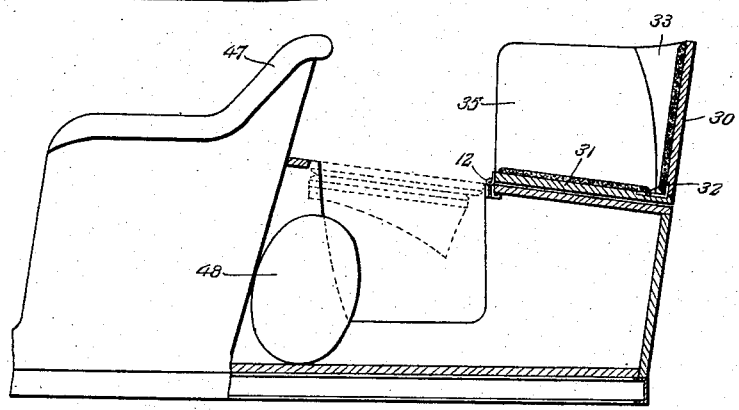

UNITED STATES PATENT OFFICE.

LOUIS DIAMOND, OF GOLDFIELD, NEVADA.

COMBINED AUTO BOX AND SEAT.

1,175,135.  Specification of Letters Patent.  Patented Mar. 14, 1916.

Application filed May 19, 1914. Serial No. 839,559.

*To all whom it may concern:*

Be it known that I, LOUIS DIAMOND, a citizen of the United States, residing at Goldfield, in the county of Esmeralda and State of Nevada, have invented new and useful Improvements in Combined Auto Boxes and Seats, of which the following is a specification.

This invention relates to automobile bodies and the object in view is to provide a combined rear box and seat convertible from one to the other and when in the form of a box serving as the usual luggage carrier at the rear of the machine and when employed as a seat, forming a very convenient, attractive and well proportioned rear seat, the construction adapting the machine to be used either as a touring car or as a roadster.

With the above and other objects in view, the invention consists in the novel construction, combination and arrangement of parts, as will be hereinafter more fully described, illustrated and claimed.

In the accompanying drawings:—Figure 1 is a side elevation of a sufficient portion of an automobile to illustrate the present invention in its application thereto, said view showing the seat closed. Fig. 2 is a similar view showing the flaps opened preparatory to lifting the seat to its useful position. Fig. 3 is a similar view showing the seat in its useful position. Fig. 4 is a vertical longitudinal section through the device under the arrangement shown in Fig. 3. Fig. 5 is a side elevation similar to Fig. 1 showing the combined box and seat made shiftable. Fig. 6 is a vertical longitudinal section through the same. Fig. 7 is a side elevation of a combined rear box and seat showing the same arranged for touring purposes. Fig. 8 is a side elevation partly in section of the same, indicating by dotted lines the folding of the seat and its back from the gasolene tank after the removal of the side bars. Fig. 9 is a vertical cross section taken in line with the folded seat and back after the latter have been folded to the dotted line position of Fig. 8. Fig. 10 is an enlarged detail section on the line 10—10 of Fig. 5. Fig. 11 is a detail perspective view of one of the back hinges. Fig. 12 is a side elevation of the body after the folding operation has been completed. Fig. 13 is a plan view of the same. Fig. 14 is a side elevation partly in vertical longitudinal section, of the arrangement shown in Fig. 12 with the rear seat in position.

The combined luggage box and auxiliary seat contemplated in this invention, comprises, in the preferred embodiment thereof, a floor 1, sides 2 which form extensions of the front stationary side-boards, and a back 3, the sides 2 being extended upwardly at their rear portions to form risers 4 and also to form door ways 5 at opposite sides of the body which door ways are closed under one arrangement of the parts by means of the sides 6 of a hinged seat designated generally at A, said seat comprising the bottom 7 and back 8 in addition to the sides 6. The seat 7 is suitably upholstered as shown at 9 and the back is likewise upholstered as at 10.

11 designates a box top lid or cover which is hinged on the same axis as the seat A and covers in the rear portion of the body back of the point where the auxiliary seat is hinged. The same hinge rod 12 answers both for the seat A and the top or lid 11, said rod extending through hinge knuckles on the front edge of the seat and the front edge of the box top or lid 11, the hinge embodying a stationary bar 13 which extends entirely across the body adjacent to the top of the risers and is provided with flanges 14 at its ends which are rigidly fastened to said risers 4.

In order to provide for opening and closing the seat A and retain the attractive appearance of the combined seat and box, I provide side flaps 15 which are hinged at 16 to the forward part of the body which is shown as consisting of the back of the front seat 17. The free edges or flaps 15 are described on concave lines 18 which conform to and fit into rabbets 19 formed in the sides 6 of the movable seat, the said free edges of the side flaps 15 being thus brought into flush relation with the outside faces of the sides 6. A horizontal or top flap 19' is hinged to the back of the front seat as shown at 20 and is adapted to close the gap between the front seat and the back seat when the latter is closed as shown in Fig. 4. Thus when the auxiliary or back seat is closed, only the lines of division are discernible around the door way 6 and the meeting points between the flaps 15 and 19' and said auxiliary seat. When the seat is thus folded, the hinged cover or lid 11 may be raised to give access to the interior of the box and when the seat is open, it rests upon the cover 11 which forms a support for said seat.

Suitable fasteners 21 are provided for holding the seat in its useful position and other fasteners 22 are employed for fastening the flaps 15 and 19' when in their normal positions.

Under the arrangement illustrated in Figs. 1 to 5 inclusive, the flaps 15 and 19' are discernible in order to give a finished appearance to the device and in order to adapt the hinged seat to be folded to and from its useful position in order to provide clearance for the top edge of the back of the seat. In Figs. 5 and 6, the hinged flaps are dispensed with and the same result is accomplished by mounting the combined seat and box in such manner that it may be shifted or slid in a fore and aft direction thereby giving sufficient clearance behind the front seat for the swinging movement of the rear or auxiliary seat. In order to do this, the box is provided at opposite sides thereof with hangers or runners 23 which embrace the parallel side bars 24 of the machine frame or chassis, the said hangers or runners containing rollers 25 which travel upon the side bars 24 as tracks to facilitate the sliding movement of the box, the latter when in its final adjusted position being held by means of set screws 26 or their equivalent carried by the hangers or runners 23. In order to give the device shown in Figs. 5 and 6 a finished appearance, stationary flaps or cheek pieces 27 extend rearwardly from the back of the front seat 17 and fit into flush seating rabbets 28 in the sides of the seat when closed and also against the meeting edges 29 of the forward portion of the shiftable box. The arrangement shown in Figs. 5 and 6 has the advantage of requiring less room in a fore and aft direction, enabling a shorter body to be produced.

Another arrangement involving the same principle is illustrated in Figs. 7 to 14 inclusive in which the back 30 of the seat is hinged at its bottom edge to the seat 31 as shown at 32. The back 30 is provided at its opposite side edges with corner flaps 33 hinged thereto as shown at 34 in Fig. 9 and adapted to be fastened to the sides 35 of the seat by means of hasps 36 provided with slots 37 to receive clamping screws 38 on the sides 35, each hasp being hinged at 38 to a fixed leaf 39, secured to the flap 33. Each of the side doors 40 is hinged at 41 to the adjacent side 42 of the box or body and is also provided with an attaching section 43 hinged thereto at 44 and detachably connected by hasps 45 and binding screws 46 to the front seat 47 as shown in Fig. 7. The flap 43 is employed to fill in the gap or space between the top portion of the door 40 and the back of the front seat 47. When the parts are to be folded to the position shown in Fig. 12, the doors 40 with their flaps 44 are detached from the machine, the corner flaps 33 are then disconnected from the sides 35 and folded backwardly on their hinged connection with the back 30. The back 30 is then folded downwardly on the seat 31 and the seat and back together are inverted or thrown forward and downward to the dotted line position of Fig. 8 where it will be observed said parts do not interfere with the usual roadster gasolene tank 48. After the folding operation above referred to has been completed, the machine appears as shown in Fig. 12 and in plan view in Fig. 13.

It will also be understood that the construction referred to may be adapted to bodies of different sizes and shapes. For example, in Fig. 9 the invention is shown applied to a box in which the sides swell or flare outwardly from the bottom to the top. In other cars the sides may be straight while in other cars the sides of the box may slope inwardly toward the top. This would, of course, cause a proportionate variation in the width of the rear foldable seat but it will be understood that such changes in the form, proportion and minor details of construction may be resorted to without departing from the spirit or sacrificing any of the advantages of the invention.

What I claim is:—

A rear box and seat combined for automobile bodies, comprising sides having risers and door ways, a back connecting said risers, a box top supported by said back and risers, and a seat hinged along its front edge to said risers and adapted to be supported in its useful position by said box top and to be swung forwardly on its hinge to an inverted position in rear of the front seat, and hinged side flaps for closing the side gaps between the front and back seats when the back seat is moved to inoperative position, the sides of the hinged seat being rabbeted to form a flush seating for the edges of said flaps.

In testimony whereof I affix my signature in presence of a witness.

LOUIS DIAMOND.

Witness:
E. EDMONSTON, Jr.

Copies of this patent may be obtained for five cents each, by addressing the "Commissioner of Patents, Washington, D. C."